Figure 1:
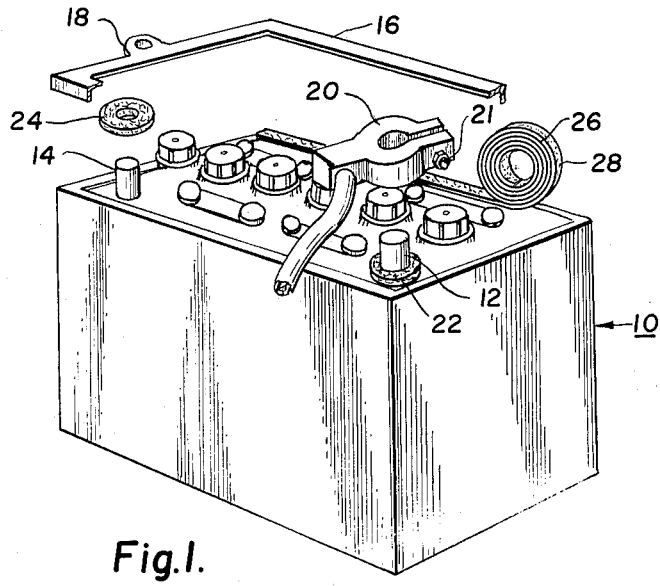

Dec. 21, 1965    C. DEIBEL ET AL    3,224,906
ACID-RESISTANT MATERIAL FOR USE IN PROTECTING
BATTERY TERMINALS AND THE LIKE
Filed June 18, 1963

INVENTORS
CHARLES DEIBEL and
JOSEPH EVANICSKO, Jr.
BY
their ATTORNEY

United States Patent Office

3,224,906
Patented Dec. 21, 1965

3,224,906
ACID-RESISTANT MATERIAL FOR USE IN PROTECTING BATTERY TERMINALS AND THE LIKE
Charles Deibel, 414 N. 3rd St., and Joseph Evanicsko, Jr., Spanish Villa, R.D. 2, both of Jeannette, Pa.
Filed June 18, 1963, Ser. No. 288,837
7 Claims. (Cl. 136—135)

This application is a continuation-in-part of copending application Serial No. 236,636, filed November 9, 1962, and now abandoned.

This invention relates to a material for use in protecting metallic and other objects from attack by acids. More particularly, the invention relates to a material and articles of manufacture made therefrom for protecting battery terminals, clamps or other parts from acid attack.

It is well known that a common difficulty arising in automotive batteries is that of corrosion occurring at the terminals and around the clamp which holds the battery in place. The result of this corrosion, if not properly carried for, is poor electrical connection and gradual disintegration of the terminals and cable connectors as well as the clamp. To overcome this difficulty, it has been more or less common to dissolve the corrosive deposits by periodically applying soda water or by sprinkling a small amount of baking soda over the terminals, connectors and clamp such that any acid arising up the terminal posts or flowing onto the clamp will react with the baking soda and become neutralized. In actual practice, however, gasoline station attendants and mechanics fail to properly care for battery terminals and clamps by dissolving the corrosive deposits in the manner described above with the result that an extensive amount of corrosion can usually be seen around the terminals; and in older vehicles the corrosion sometimes weakens the battery clamp to the point where it will break.

As an overall object, the present invention seeks to provide a porous material which is impregnated with a basic substance so as to be resistant to acids. In one embodiment of the invention shown herein, the porous material is chemically inert such that it can be used as an effective "insulator" between an acidic medium and an article which would otherwise be attacked by the acid. Preferably, the porous material in this embodiment of the invention comprises compressed glass fibers while the acid-resistant substances comprises liquid natural rubber latex mixed with a saturated water solution of sodium carbonate. It has been found that the sodium carbonate, being a powder, cannot be effectively retained within the glass fibers. However, by mixing sodium carbonate with latex and by impregnating the glass fibers with the mixture, the latex serves as a binder which will adhere to the fibers and retain the sodium carbonate. Furthermore, the sodium carbonate makes the latex permeable to liquid solutions so that the sodium carbonate can readily neutralize the acid.

In another embodiment of the invention, and in accordance with the foregoing object, the porous material comprises metallic fibers which are pressed in a closed die and sintered to obtain the desired shape and mechanical strength. The alkaline material can be blended and pressed with the fibers or added through infiltration techniques after the fibers have been pressed and sintered.

Another object of the invention is to provide an acid-resistant material of the type described which is cut into circular washers and placed over battery terminals beneath the cable connectors, or cut into strips which are placed beneath the battery clamp around the edges of the battery. Usually, the sulfuric acid which invariably gets onto the surface of the battery forms a film on the surface which "flows" to the clamp or rises up the terminal and connector. By providing acid-resistant washers formed from chemically inert fibers around the bottoms of the terminals, an effective neutralizing barrier is presented to the acid before it reaches the terminals. Likewise, a similar barrier is presented between the battery surface and its clamp by strips of the acid-resistant material placed around the edge of the battery.

Another object of the invention is to form the cable connector itself from sintered metallic fibers impregnated with a base or to provide a sintered sleeve impregnated with a basic material which can be slipped over the battery terminal before the cable connector is applied. In either case, the basic material in the sintered material neutralizes the acid and prevents it from otherwise attacking the metallic parts.

Still another object of the invention is to provide acid-resistant washers, strips and the like incorporating an alkaline substance and a material which will change color when the alkaline substance is neutralized. Thus, a change in color of the article will indicate that its effectiveness has been depleted and that it must be replaced with a new acid-resistant article.

Figures 2, 3:
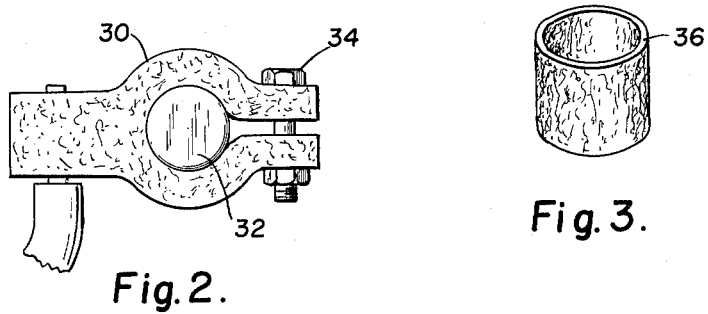

The above and other objects and features of the invention will become apparent from the following detailed description taken in connection with the accompanying drawings which form a part of this specification, and in which:

FIGURE 1 is an illustration of a battery showing the manner in which washers and strips of chemically inert fibers impregnated with a basic material may be applied to the battery to prevent corrosion of metallic parts;

FIG. 2 is an illustration of a battery clamp comprising compressed and sintered metallic fibers impregnated with a basic material to prevent corrosion; and FIG. 3 is a perspective view of a sleeve or collar comprising compressed and sintered metallic fibers impregnated with a basic material which may be inserted over the battery terminal to act as a barrier between the terminal and the battery clamp.

Referring now to the drawings, and particularly to FIG. 1, a conventional storage battery 10 is shown having lead connecting terminals 12 and 14 projecting upwardly from its top surface in accordance with usual practice. In the usual case, the battery is held in place by means of a metallic frame or clamp 16 which extends around the upper edge of the battery and is provided with lugs 18 having openings therein for the reception of clamping bolts.

As was explained above, the sulfuric acid within the battery will invariably get on its surface with the result that a thin film of acid is formed on the surface which eventually "flows" to the battery terminals 12 and 14 and the clamp 16. This causes corrosion of the clamp 16 and the terminals 12 and 14 as well as the cable connectors 20 which pass over the terminals 12 and 14 and are clamped thereto by bolts 21.

In accordance with the present invention, washers 22 and 24 are placed over the terminals 12 and 14 before the connectors 20 are applied. The washers 22 and 24 are cut from a sheet of compressed chemically inert fibers which are impregnated with a mixture of natural rubber latex and an alkaline substance. As was mentioned above, the chemically inert fibers of the washers 22 and 24 preferably comprise glass fibers; while the alkaline substance mixed with the natural rubber latex is preferably sodium carbonate or sodium bicarbonate, although any suitable alkaline substance may be used in its place which will dissolve in the latex. In the manufacture of such washers, a mat or sheet of compressed glass fibers is initially dipped into a mixture of liquid natural rubber latex and sodium carbonate and permitted to dry in the air. Thereafter, annular blanks are cut from the mat or sheet to form the washers. The latex acts as a binder to retain the sodium carbonate within the glass fibers; while the sodium carbonate makes the latex permeable to liquid solutions such that the acid can see into the washer and chemically react with the sodium carbonate to effect a neutralizing action. It is important that the material from which the washers 22 and 24 are formed be chemically inert. Felt washers, for example, would be attacked by the acid and will disintegrate in a short time. As mentioned above, the latex is preferably of the natural rubber type, although certain types of synthetic latex may be used if they will dissolve the alkaline substance.

The compressed glass fibers containing a mixture of natural rubber latex and sodium carbonate can also be cut into strips and wound into a roll 26. By providing one side of the strip material with a suitable pressure-sensitive adhesive 28, it may be readily applied around the upper edge of the battery 10 by a slight amount of pressure. The strip material, therefore, acts as a neutralizing barrier between the battery surface and the clamp 16 in much the same way as the washers 22 and 24.

In FIG. 2, a cable connector 30 is shown surrounding a battery terminal 32. The connector 30 is split in accordance with usual practice and is clamped to the terminal 32 by means of a clamping bolt 34. Connector 30 is formed from metallic fibers which are pressed in a closed die and sintered to obtain the desired shape and mechanical strength. A neutralizing agent such as baking soda can be blended and pressed with the fibers before sintering or added through infiltration techniques after the fibers have been pressed and sintered. In either case, the result is a porous article containing a neutralizing agent which is locked within the fibrous structure. As acid rises up the terminal 32, it reacts with the baking soda or other neutralizing agent, which results in a neutralizing effect. A few drops of water periodically applied along the inside rim of the connector will insure a complete neutralizing effect.

Actually, when the baking soda or other neutralizing agent in the connector 30 has been depleted, it would have to be replaced by a new connector. Another arrangement utilizing the basic concept of the present invention which would eliminate the necessity for replacing the connector is shown in FIG. 3. It comprises a sleeve 36 formed in the same manner as the connector 30 of FIG. 2. That is, it comprises pressed and sintered metallic fibers impregnated with a basic or neutralizing agent. The sleeve 36 is passed over the terminal 32 before the connector 30 is applied with the metallic fibers of the sleeve acting as an electrical connection between the terminal and the connector. As acid rises up the terminal, the basic material in the sleeve 36 will effect a neutralizing action. This arrangement, of course, has the advantage that when the neutralizing agent in the sleeve 36 is depleted, the sleeve can be more easily replaced than a new connector.

As was mentioned above, one of the objects of the invention is to provide acid-resistant washers, strips and the like which will change color when the neutralizing action of the alkaline material has been expended, thereby indicating to the mechanic or service station attendant that is should be replaced. For this purpose an indicator such as powdered methyl red (p-dimethylaminoazobenzene-O'-carboxylic acid) is mixed with the alkaline substance such as sodium carbonate and liquid natural rubber latex, the compressed glass fibers being impregnated with the mixture. In this manner, the methyl red, which is normally yellow in color (at a pH value of about 5.5 and above), will turn red when the pH value of the mixture falls, indicating that the washer or strip is no longer effective to neutralize the acid.

Actually other indicators can be used other than methyl red, depending upon the pH value at which it is desired to replace the article. For example, bromothymol blue can be used which will change from blue to yellow at a pH value of about 6.5. Other indicators are methyl orange which will change from yellow to red at a pH value of about 4, and paramethyl red which changes from yellow to red at a pH value of about 2. The preferable indicator, however, is methyl red for two reasons: First, it changes color at a relatively low acidic concentration; and, second, the bright red color which it assumes under acidic conditions is readily detected.

Although the invention has been shown in connection with certain specific embodiments, it will be readily apparent to those skilled in the art that various changes in form and arrangement of parts may be made to suit requirements without departing from the spirit and scope of the invention. In this respect, it is apparent that possible binders other than natural rubber latex could be used for chemically inert fibrous materials and that the chemically inert fibers could comprise a material other than glass. Furthermore, although sodium carbonate has been found to work particularly well in the embodiment of FIG. 1, any basic material could be used for this purpose which can be combined with natural rubber latex.

We claim as our invention:

1. As an article of manufacture, a washer adapted to be placed over a storage battery terminal to prevent acid on the battery surface from rising up the terminal and onto an electrical connector on the terminal, the washer comprising compressed glass fibers impregnated with a mixture of a binder and an alkaline substance.

2. The article of manufacture of claim 1 wherein the binder comprises natural rubber latex.

3. A battery connector adapted to be clamped to a battery terminal comprising compressed and sintered metallic fibers impregnated with an alkaline substance.

4. A sleeve adapted to be passed over a battery terminal to prevent corrosion of the terminal and a cable connector applied thereto comprising compressed and sintered metallic fibers impregnated with an alkaline substance.

5. As an article of manufacture, a washer adapted to be placed over a storage battery terminal to prevent acid on the battery surface from rising up the terminal and onto an electrical connector on the terminal, the washer comprising compressed glass fibers impregnated with a mixture of latex, an alkaline substance which will dissolve in the latex and an indicator which will change color when the acidic neutralizing action of the alkaline substance has been expended.

6. The article of manufacture of claim 5 wherein the alkaline substance is sodium carbonate and the indicator is methyl red.

7. An acid-resistant material comprising compressed glass fibers impregnated with a mixture of latex and a basic material selected from the group consisting of sodium carbonate and sodium bicarbonate, the latex being intimately mixed with the basic material and acting as a binder to retain the basic material within the glass fibers, the basic material rendering the latex permeable to liquid solutions such that acid can seep into the latex and chemically react with the basic material therein to effect a neutralizing action, as is produced by dipping the glass fibers into a mixture of liquid rubber latex and the basic material and drying the dipped product.

References Cited by the Examiner

UNITED STATES PATENTS

| | | | |
|---|---|---|---|
| 2,081,435 | 5/1937 | Parmeson | 136—135.31 |
| 2,246,060 | 6/1941 | Newhouse | 136—135.33 |
| 2,607,810 | 8/1952 | Walker | 136—145.6 |
| 2,922,833 | 1/1960 | Philipp | 136—182 |
| 3,019,127 | 1/1962 | Czerwonka et al. | |
| 3,031,740 | 5/1962 | Culbertson et al. | 29—182.5 |
| 3,035,965 | 5/1962 | Mathews | 162—157 |

FOREIGN PATENTS

| | | |
|---|---|---|
| 826,663 | 4/1938 | France. |
| 492,974 | 4/1954 | Italy. |
| 512,618 | 2/1955 | Italy. |

ALLEN B. CURTIS, *Primary Examiner.*

JOHN H. MACK, WINSTON A. DOUGLAS, *Examiners.*